United States Patent [19]

Forthmann et al.

[11] 4,006,096

[45] Feb. 1, 1977

[54] METHOD OF MAKING FISSIONABLE-FUEL AND FERTILE BREEDER MATERIALS FOR NUCLEAR REACTORS

[75] Inventors: Rüdiger Förthmann; Muwaffak Hamesch; Hubertus Nickel, all of Julich, Germany

[73] Assignee: Kernforschungsanlage Julich Gesellschaft mit beschrankter Haftung, Julich, Germany

[22] Filed: Jan. 26, 1973

[21] Appl. No.: 326,823

Related U.S. Application Data

[62] Division of Ser. No. 210,247, Dec. 20, 1971.

[30] Foreign Application Priority Data

Dec. 24, 1970 Germany .................. 2063720

[52] U.S. Cl. .................. 252/301.1 S; 252/301.1 R; 264/.5; 427/6
[51] Int. Cl.² ...................... G21C 3/62; G09K 3/00
[58] Field of Search .............. 252/301.1 S, 301.1 R; 264/.5; 427/6

[56] References Cited

UNITED STATES PATENTS

| | | | |
|---|---|---|---|
| 3,310,386 | 3/1967 | Lloyd | 252/301.1 S |
| 3,312,633 | 4/1967 | Smith | 252/301.1 S |
| 3,367,881 | 2/1968 | Morse | 252/301.1 S |
| 3,397,257 | 8/1968 | Brambilla et al. | 252/301.1 S X |
| 3,513,101 | 5/1970 | Meservey | 252/301.1 S |
| 3,573,217 | 3/1971 | Van Der Plas | 252/301.1 S |
| 3,629,138 | 12/1971 | Thomas | 252/301.1 S |
| 3,666,426 | 5/1972 | Burkhardt | 252/301.1 S X |
| 3,669,632 | 6/1972 | Kanij et al. | 252/301.1 S X |
| 3,717,581 | 2/1973 | Noothout | 252/301.1 S X |
| 3,773,682 | 11/1973 | Marshall et al. | 252/301.1 S |

*Primary Examiner*—Richard E. Schafer
*Attorney, Agent, or Firm*—Karl F. Ross; Herbert Dubno

[57] ABSTRACT

Fissionable fuels and/or fertile breeder materials for nuclear reactors comprised of fissionable or potentially fissionable materials having evenly distributed throughout certain metal oxides, such as aluminum oxide and niobium oxide, exhibiting the capacity to retain products formed by nuclear fission as stable, nonvolatile compounds in the nuclear material. The fuel element is combined with an effective amount of oxide that is relatively nonvolatile, has a low neutron-capture cross-section and forms such stable, nonvolatile compounds with the solid products resulting from nuclear fission.

2 Claims, No Drawings

METHOD OF MAKING FISSIONABLE-FUEL AND FERTILE BREEDER MATERIALS FOR NUCLEAR REACTORS

CROSS-REFERENCE TO RELATED APPLICATION

This application is a division of Ser. No. 210,247 filed Dec. 20, 1971.

FIELD OF THE INVENTION

The present invention relates to a method of preparing improved fissionable fuel or fertile (breeder) material for nuclear reactors and, more particularly to nuclear-reactor materials of this type adapted to retain solid fission products to prevent radioactive contamination.

BACKGROUND OF THE INVENTION

As assembly of special materials designed to sustain and control a neutron chain reaction in a fissionable fuel and/or to activate a fertile material with a neutron flux to convert it into a fissionable fuel is considered a nuclear reactor and the fissionable fuel or fertile (breeder) material is herein designated a "nuclear material". Fuels employed commonly are plutonium-239, uranium-235 and uranium-233 as elemental metals or as compounds, generally as oxides. Fertile materials, such as U-238 and Th-232, can be neutron activated in a breeder-type nuclear reactor or in a system in which a "blanket" of material surrounds a neutron-producing reactor core and utilized to produce fissionable fuels.

Gaseous and solid fission products are produced in the fission process that takes place in a nuclear reactor and because of their high specific radioactivity, must be prevented from being transported from the fissionable fuel and/or fertile (breeder) material — nuclear material — and thus contaminating the coolant. A variety of methods for retaining these various fission products are well known. In one of the methods for retaining fission products, fuels have been filled into ceramic or metallic casings. In other instances, fuels have been embedded in a graphite matrix. Commonly, small particles of fuel with a diameter less than 1 mm have been coated with layers of pyrolytic carbon and/or suitable carbide compounds as, for example, silicon carbide, (see *CERAMIC COATED PARTICLE NUCLEAR FUELS, JOURNAL OF NUCLEAR MATERIALS*, volume 11, No. 1, page 1–31 (1969). The particles may be embedded in a graphite matrix or a metal container or may be used in the particulate state, e.g. in a gas-cooled high-temperature reactor. When metallic or ceramic sheaths are employed, one must cope with the disadvantage that if a fissure in the matrix develops, a common occurrence in the operation of a nuclear reactor, the fission products that have been formed have the opportunity to escape from the fuel element. This situation also applies to fuel elements where the nuclear fuel material is embedded in a matrix of graphite and also to fuel elements in which the fuel is contained in small particles coated with pyrolytic carbon. In the latter case, attempts have been made to counteract the escape of solid fission products through the pyrocarbon layer by additionally coating the particles with compounds such as silicon carbide. This measure however, requires additional work and expense which makes the preparation of the fuel element substantially more expensive. Moreover, this also complicates subsequent steps in reprocessing particles of the fuel thus treated.

OBJECTS OF THE INVENTION

The principal object of the present invention and the basic problem for which this invention provides an adequate solution is to remedy the inadequacies of nuclear fuels by the development of a fuel fissionable, or fertile (breeder) material, employed especially in high-temperature reactors, in which the solid fission products are confined and held with a degree of safety mandated by good manufacturing practice and procedures.

Another object of the invention is to provide an improved fissionable fuel of fertile material which is relatively simple to prepare and as employed, in the form of coated particles, can be recovered and regenerated without great difficulty and expense.

Still another object of the invention is to provide an improved method of making a nuclear material capable of generating fission products — (especially Sr-90 and Ba-140), whereby the aforementioned problems can be overcome.

DESCRIPTION OF THE INVENTION

The objects of the invention can be achieved as a result of our surprising discovery that certain metallic oxides, such as aluminum oxide, uniformly distributed throughout a nuclear fuel, or fertile material form stable, nonvolatile compounds in the fuel used in the reactor core, especially in high-temperature applications, with solid fission products formed during the nuclear cycle, such as, strontium, barium and the like. This particular phenomenon provides the result that these fission products are retained in the nuclear-material.

In light of the foregoing, the specific aim of this invention regarding a nuclear fuel element and/or fertile fuel material is solved by adding to the nuclear fuel, oxides, such as aluminum oxide and niobium oxide, in an amount of at most about 10 atomic percent, these substances are materials nonvolatile at temperatures of at least 1000° C, exhibiting low neutron-capture cross-section and which at temperatures above 800° C form stable, nonvolatile compounds with the fission products resulting from nuclear reaction.

The adjuncts can be mixed as a powder with the pulverized nuclear fuel, although it is of course possible and common to prepare the fuel in an aqueous solution. The adduct can be added in an aqueous solution and subsequently, during sintering, it is transformed into it's respective oxide, thus being evenly distributed throughout the nuclear fuel core.

Our investigations have shown that, while one generally would not expect any highly stable compound such as ceramics of the aluminum oxide or niobium oxide type to react with solid fission products of the type produced by the decomposition of nuclear materials as described above, for reasons which are not fully clear, these compounds by purely chemical reaction, chemisorption or otherwise act to trap strontium-90 and barium-140 to retain the latter in a tightly bound state within the particle of nuclear material, thereby preventing the release of these dangerous radioactive species into the coolant or into the environment during reprocessing.

We have found that the aluminum oxide and niobium oxide additives can be used individually or jointly or even may be formed in situ in the nuclear particle from other aluminum and niobium compounds, e.g. by firing or sintering. The aluminum oxide and/or niobium oxide, which may be referred to hereinafter as the "additive" should generally be present in an amount up to 10 atomic percent calculated in terms of the metals or in an amount of up to 10 mole percent, calculated in terms of the number of molecules of the fissionable-fuel or fertile (breeder) materials. Amounts above 10 atomic percent have proved to be unnecessary and quantities well below this level may be employed although the trapping effect of the additive is reduced at very low proportions. Best results are obtained with an additive concentration above about one atomic percent while aluminum oxide and niobium oxide are preferred additives as already noted. Other compounds may be suitable provided that they are themselves nonvolatile at a temperature of at least 1000° C, are capable of forming a nonvolatile stable interaction product with solid fission products at a temperature of 800° C or higher wherein the interaction product is nonvolatile at these latter temperatures, possesses a low neutron-capture cross-section, and can be incorporated conveniently in the nuclear materials.

The nuclear material may be formed into a core and provided with a ceramic-like or pyrolytic carbon coating as described in CERAMIC COATED PARTICLE NUCLEAR FUELS, JOURNAL OF NUCLEAR MATERIALS, volume 11, No.1, pages 1–31 (1964). The system applies to any of the nuclear materials mentioned earlier and the resulting coated particles may be incorporated in a graphite matrix (see commonly assigned U.S. Pat. No. 3,565,762). The system is best used in a high-temperature nuclear reactor as described at pages 700 ff. of CONCISE ENCYCLOPEDIA OF NUCLEAR ENERGY, INTERSCIENCE PUBLISHERS, New York 1962.

SPECIFIC EXAMPLES

Example I

A solution consisting of 255.0 gms $Th(NO_3)_4 \cdot 5H_2O$ and 28.5 gms $UO_2(NO_3)_2 \cdot 6H_2O$ in 500 mls water was added with stirring to 500 mls of a 25% $NH_4OH$ solution. The resulting precipitate was separated from the supernatant solution by suction filtration and washed until the wash water as free from ions with a total of 10 liters of water. In a further step of the process, the precipitate was stirred together with 1.5 liters water after the addition of 9.4 gms $Al(NO_3)_3 \cdot 9H_2O$ and 125 mls 1 M $HNO_3$ heated to boiling. The resulting colloidal solution was evaporated to 167 mls, which resulted in a concentration of approximately 600 gms Th/liter. Subsequently the sol was mixed at 10° C with 1 M hexamethylene-tetramine solution (0.5 – 1.0 mls/10 gms sol) and dropped into a paraffin oil bath at 90° – 95° C. The particles formed in this process were freed from adhering paraffin with petroleum ether. In order to remove the $NH_4NO_3$ developed through gelling of the drops of sol, the particles were stored for 5 hours in a glass container under a concentrated ammonia solution. Then the solution was removed by suction filtration and the particles were dried in air at 50° – 70° C to the extent that they could roll freely. After this treatment, the particles were sintered for 5 hours at 1300° C in a hydrogen-flushed tube furnace with a silicon carbide heater, until they formed dense fuel cores. These fuel particles were subsequently coated in a liquified graphite bed at 1550° C through disintegration of acetylene with a porous pyrocarbon layer and at 1300° C coated through disintegration of propylene with a dense layer of pyrocarbon.

A comparative investigation of the release of the important fission products, strontium-90 and barium-140, from this type of coated particles in this manner under the conditions prevailing in a reactor, demonstrated that in contrast to what happened with particles containing fuel cores free from $Al_2O_3$ or the like, no release of Sr-90 and Ba-140 took place from the particles described above after 21 days at 1200° C.

Example II

A mixture of 80 mole percent thorium-232 oxide and 11 mole percent uranium-235 oxide and 9 mole percent aluminum oxide is ground together agglomerated into particles of a particle size of about 100 microns and sintered. The particles are then coated as described in the cited article with a silicon carbide layer and a pyrolytic carbon layer so that the coated particles have diameters of about 800 microns. The particles are then incorporated in graphite balls (U.S. Pat. No. 3,565,762 and the literature therein cited) and tested in a nuclear reactor. No release of solid radioactive contaminants was observed even when the graphite balls were themselves handled and cracked intentionally.

We claim:
1. A method of preparing a nuclear material for a nuclear reactor which comprises the steps of:
    a. precipitating an aqueous solution of a nuclear material selected from the group which consists of thorium and uranium nitrates with ammonium hydroxide and filtering the precipitate,
    b. combining the precipitate with an aqueous solution containing a water soluble aluminum or niobium salt and nitric acid heated to boiling to form a colloidal solution,
    c. partially evaporating the colloidal solution and mixing with hexamethylenetetramine and adding to a paraffin oil bath to form particles,
    d. freeing the particles by washing with petroleum ether and extracting the ammonium nitrate by storing under a concentrated ammonia solution, removing the particles by filtration and air drying,
    e. sintering the particles until dense fuel cores form, and
    f. coating the fuel particles with a pyrocarbon layer.
2. The method of preparing a fuel for a nuclear reactor as defined in claim 1 wherein the aluminum or niobium compound is in the form of a water soluble salt is subsequently converted to a corresponding oxide by the sintering.

* * * * *